United States Patent [19]  
Hall

[11] 4,191,676  
[45] Mar. 4, 1980

[54] AUTODEPOSITION PROCESS AND COMPOSITION

[75] Inventor: Wilbur S. Hall, Plymouth Meeting, Pa.

[73] Assignee: Union Carbide Corporation, New York, N.Y.

[21] Appl. No.: 907,902

[22] Filed: May 22, 1978

Related U.S. Application Data

[63] Continuation of Ser. No. 664,613, Mar. 8, 1976, abandoned, which is a continuation-in-part of Ser. No. 562,898, Mar. 27, 1975, abandoned.

[51] Int. Cl.$^2$ .................................................. C08L 9/08
[52] U.S. Cl. ................................. 260/29.7 R; 427/435
[58] Field of Search ...................... 260/29.7 R; 427/435

[56] References Cited

U.S. PATENT DOCUMENTS

| | | | |
|---|---|---|---|
| 3,397,165 | 8/1968 | Goodman et al. | 260/29.6 RB |
| 3,709,743 | 1/1973 | Dalton et al. | 260/29.6 RB |
| 4,103,049 | 7/1978 | Nishida et al. | 260/29.6 MM |

FOREIGN PATENT DOCUMENTS

| | | | |
|---|---|---|---|
| 780486 | 3/1972 | Belgium | 260/29.6 MM |
| 811841 | 3/1974 | Belgium | 260/29.6 MM |
| 1467151 | 3/1977 | United Kingdom | 260/29.6 RB |

*Primary Examiner*—Maurice J. Welsh  
*Attorney, Agent, or Firm*—Dale Lynn Carlson

[57] ABSTRACT

An acidic aqueous coating composition having dispersed therein solid resin particles and of the type which forms on a metallic surface immersed therein a resinous coating which increases in thickness or weight the longer the time the surface is immersed in said composition, said composition being characterized by having therein (A) particles of resin which are prepared by polymerizing (i) a conjugated diene, (ii) $CH_2=CHR$ wherein R is an aryl or cyano group, (iii) a vinyl halide, and (iv) a monoethylenically unsaturated monomer having a functional group or (B) resin particles which are substantially chemically and physically homogeneous, and wherein said composition has little or no surfactant in the aqueous phase of the composition.

55 Claims, No Drawings

AUTODEPOSITION PROCESS AND COMPOSITION

CROSS-REFERENCE TO RELATED APPLICATION

This is a continuation of application Ser. No. 664,613, filed Mar. 8, 1976, now abandoned which is a continuation-in-part of application Ser. No. 562,898, filed Mar. 27, 1975, now abandoned.

FIELD OF THE INVENTION

This invention relates to the formation of resinous coatings on metallic surfaces. More specifically, this invention relates to the deposition on metallic surfaces of resinous coatings by contacting the metallic surfaces with an acidic aqueous coating solution containing dispersed solid resin particles.

A relatively recent development in the coating field is the provision of resinous coating compositions which are effective, without the aid of electricity, in forming on the metallic surfaces immersed therein resinous coatings that increase in thickness or weight the longer the time the surfaces are immersed in the compositions. (For convenience, such a coating is hereafter referred to as "a resinous coating which grows with time" or as an "autodeposited coating".) Speaking generally, compositions which are so effective comprise acidic aqueous coating solutions having dispersed therein solid resin particles. Autodeposited coatings are formed from such compositions as a result of their ability to attack and dissolve from the metallic surface metal ions in amounts which cause the resin particles to deposit on the surface in a manner such that there is a continuous buildup of resin on the surface.

Coatings formed from such compositions are distinctly different from coatings formed by immersing the metallic surfaces in conventional latices, that is, compositions comprising solid resin particles dispersed in water. The weight or thickness of a coating formed by immersing a metallic surface in a conventional latex is not influenced by the time the surface is immersed in the latex. It is in the main influenced by the amount of resin solids dispersed in the aqueous medium.

Coatings formed from the aforementioned recently developed coating compositions are also distinctly different from coatings formed from earlier known acidic aqueous coating solutions containing dispersed solid resin particles and relatively high amounts of water soluble corrosion inhibitors, such as compounds containing hexavalent chromium. The use of relatively high amounts of corrosion inhibitors in such solutions deters attack of the metallic surface to an extent such that resinous coatings which grow with time are not obtained. Thus, resinous coatings formed by immersing metallic surfaces in such compositions are like those formed from immersing the metallic surfaces in conventional latices in that they do not grow with time.

The use of the recently developed coating compositions which produce coatings which grow with time offer a number of advantages. For example, other factors held constant, they can be used to apply thicker resinous coatings to the metallic surface in a shorter period of time and in a one-step operation. Also, the coating thickness can be controlled by varying the immersion time of the metallic surface in the coating composition. In general, resinous coatings which have improved corrosion resistant properties and aesthetic appearance are obtainable. These are but a few of the advantages which flow from the use of said compositions.

The present invention relates to a coating composition of the type which forms on a metallic surface a resinous coating which grows with time and one which has a combination of desired properties, including the ability to form coatings which grow in thickness or weight at a relatively fast rate and the capability of being used to form coatings having improved corrosion resistant properties.

REPORTED DEVELOPMENTS

Acidic aqueous coating solutions having dispersed therein solid resin particles and having the capability of forming on metallic surfaces immersed therein resinous coatings which grow with time are disclosed in various patents.

For example, U.S. Pat. Nos. 3,585,084 and 3,592,699, each to Hall and Steinbrecher, and assigned to the same assignee as the present invention, disclose resinous coating compositions comprising an aqueous solution of acid and oxidizing agent, and solid resin particles dispersed therein. The preferred composition described in these patents is prepared by admixing hydrofluoric acid and either hydrogen peroxide or dichromate and a latex.

U.S. Pat. No. 3,709,743 discloses a resinous coating composition comprising an acidic aqueous solution of nitric acid and dispersed resin solids.

South African Pat. No. 72/1146 discloses an acidic aqueous coating solution prepared from an acid, a soluble iron compound and dispersed resin solids, and optionally an oxidizing agent. The preferred coating composition described in this patent is prepared from hydrofluoric acid, ferric fluoride, and a latex. Belgian Patent of Addition No. 811,841 discloses the use of other soluble metal compounds such as, for example, a compound of copper, cobalt, or silver in coating compositions which form resinous coatings which grow with time.

The present invention is directed to the provision of a coating composition which is effective in forming on a metallic surface a coating which grows in thickness at a relatively fast rate and, in addition, can be used to form coatings which have corrosion resistant properties which enable the coatings to be used in a wide variety of applications.

SUMMARY OF THE INVENTION

The coating composition of the present invention comprises the use of a particular kind of resin or latex in combination with other ingredients which are effective in providing an acidic aqueous coating composition which forms on a metallic surface immersed therein a resinous coating which grows with time. The resin or latex, described in detail below, is (A) one which is prepared by polymerizing a (i) conjugated diene, (ii) $CH_2=CH-R$ wherein R is aryl or cyano, (iii) a vinyl halide, and (iv) a monomer containing an amide or carboxylic functional group or (B) one wherein the resin particles are all of of substantially the same size and each of the particles is substantially chemically homogeneous, that is, each particle is comprised of the same monomeric constituents present in substantially the same proportions.

The coating composition of the present invention is one in which the amount of surfactant in the aqueous phase of the composition is below the critical micelle concentration. As will be explained in detail below, the composition contains little or no surfactant in the aqueous phase.

The preferred coating composition of the present invention is one in which the particles of resin, as described above are dispersed in an acidic aqueous solution which is prepared by combining a soluble ferric-containing ingredient, most preferably ferric fluoride, and hydrofluoric acid.

Coating compositions within the scope of the present invention and containing a relatively small amount of resin solids, for example, about 7–8 wt. %, are effective in forming on a metallic surface immersed therein a resinous coating which grows in thickness at a relatively fast rate, producing, for example, a coating having a thickness of as much as 1 mil or more when the metallic surface is immersed therein for as short a time as about 90 seconds. As will also be seen from examples set forth below, coating compositions within the scope of the present invention can be used to form coatings which have a high degree of corrosion resistance. The ability of the coating composition to so function has the important advantage of allowing the user to accelerate production rates in that it is possible to produce coatings of desired thicknesses within relatively short periods of time and coatings which also have excellent corrosion resistant properties.

DETAILED DESCRIPTION OF THE INVENTION

The particular resins, mentioned briefly above and described in detail below can be used in the various types of coating compositions which are effective in forming resinous coatings which grow with time. Examples of such coating compositions are described in U.S. Pat. Nos. 3,585,034, 3,592,699 and 3,709,743, in British Pat. No. 1,241,991, in South African Pat. No. 72/1146 and in Belgian Patent of Addition No. 811,841.

Speaking generally, the acidic aqueous coating compositions of the aforementioned type function to attack and dissolve from a metallic surface contacted therewith metal ions in an amount sufficient to directly or indirectly cause resin particles in the region of the metallic surface to deposit thereon in a continuous fashion, that is, in a manner such that there is a buildup in the amount of resin deposited on the surface the longer the time the surface is in contact with the composition. This deposition of the resin on the metallic surface is achieved through chemical action of the coating composition on the metallic surface. The use of electricity which is necessary for the operation of some coating methods, such as the electrocoating method, is not required.

With respect to the particular resins that are used in the coating composition of the present invention, resin (A) above is prepared by copolymerizing the following monomers:

(1) conjugated diene having, for example, 4 to about 9 carbon atoms, such as butadiene or isoprene;
(2) $CH_2=CHR$, wherein R is an aryl or a cyano group, for example, styrene or acrylonitrile;
(3) a vinyl halide such as vinyl chloride or vinylidene chloride; and
(4) a monoethylenically unsaturated monomer having a functional group selected from the class consisting of amide and carboxylic groups, such as acrylamide, methacrylamide, octyl acid maleate and monoethylenically unsaturated monocarboxylic and dicarboxylic acids having about 3 to about 12 carbon atoms, and preferably about 3 to about 5 carbon atoms, such as, for example, acrylic acid; cinnamic acid; methacrylic acid; crotonic acid; itaconic acid; maleic acid; and fumaric acid.

Although the constituents comprising the above-described resin can vary over a relatively wide range, in general, the resin will comprise the polymerized constituents in the following amounts:

(1) about 25 to about 70, and preferably about 40 to about 65 wt. % of the conjugated diene;
(2) about 5 to about 70, and preferably about 30 to about 65 wt. % of the $CH_2=CHR$ monomer;
(3) about 1 to about 50, and preferably about 3 to about 15 wt. % of the vinyl halide; and
(4) about 0.5 to about 15, and preferably, about 1 to about 4 wt. % of the aforementioned functional group-containing monomer.

The resin is used most conveniently in the form of a latex, that is, an aqueous dispersion of solid particles of the resin. The resin can be prepared according to available techniques, for example, by bulk or emulsion polymerization processes, the latter being preferred. Some examples of emulsifiers that can be used in the polymerization process for preparing the resin are sulfates, sulfonates, and sulfosuccinates. Peroxides, hydroperoxides and persulfates, for example, potassium persulfate, are examples of initiators that can be used in the polymerization process. Buffers such as phosphates, citrates, acetates and other weak acid salts can be used. Mercaptans, such as dodecyl mercaptan, are examples of chain transfer agents that can be used in the polymerization process.

Latices comprising resin (A) are known. For example, see U.S. Pat. No. 3,472,808.

Instead of the above resin or in combination therewith, the composition of the present invention can be prepared from resin particles which are chemically and physically homogeneous. As to the chemical homogeneity of the particles, the monomers and proportions thereof comprising the polymer are substantially the same for each particle. As to physical homogeneity, the size of the particles is relatively uniform. For example, with latices having an average particle size in the range of about 1,000 to about 3,500A or more, the deviation in particle size from the average is a maximum of about ±200 A.

Any suitable polymerization process can be used to prepare latices containing resin particles having the above-described properties. An example of such a process is one referred to herein as the "seed polymerization" process. The seed polymerization process involves continuously adding monomer and emulsifier at a controlled rate to a relatively small amount of latex, the resin particles of which function as a seed to provide nucleating sites for polymerization of the monomer. The controlled rate of the monomer addition consists of adding monomer so that it becomes associted with the resin particles of the latex essentially as soon as the monomer enters the reaction zone. Thus, monomer is added so that a separate monomeric phase is not formed in the reaction mixture and monomer becomes a part of the resin particle by being adsorbed or dissolved therein. The controlled rate of adding emulsifier consists of adding it in an amount that is proportional to the rate of growth of the surface area of the polymeric particles.

Typically, the seed polymerization process is carried out by charging a latex to a reaction vessel or forming it in situ. After heating the reaction vessel to the desired polymerization temperature, a polymerization initiator is added and monomer is added at a rate such that a separate monomeric phase is not formed. Instead, monomer becomes associated with the resin particles substantially as soon as it is added. An emulsifier is added concurrently with monomer to the reaction mixture at a rate which is proportional to the rate of growth of the total surface area of the polymeric particles. In general, this involves adding emulsifier at a rate such that about 30 to 70% of the surface area of the particle is covered with emulsifier, and preferably at a rate such that about 50% of the surface area of the polymeric particle is covered. The process is carried out with continuous agitation. After the addition of monomer and emulsifier, the polymerization is continued until the original seed particles of the latex have reached the desired size. This will generally be about 2 to about 9 times the size of the diameter of the original particles, but preferably is a size which is about 3 to about 4 times the size of the diameter of the original particles.

The seed polymerization process can be used to prepare a wide variety of polymers from a conjugated diene monomer such as butadiene, isoprene, or 2,3-dimethyl-1,3-butadiene and from a monomer or monomers such as styrene, acrylonitrile, acrylic acid, methacrylic acid and butylacrylate. The following are examples of copolymers that can be prepared by the polymerization process: styrene/butadiene; styrene/butadiene/acrylonitrile; styrene/butadiene/acrylic acid; styrene/butadiene/methacrylic acid; styrene/butadiene/butylacrylate; styrene/butadiene/butylacrylate/acrylic acid; styrene/butadiene/butylacrylate/methacrylic acid; butadiene/acrylonitrile; butadiene/acrylonitrile/acrylic acid; and butadiene/acrylonitrile/methacrylic acid.

Initiators and emulsifiers are used in the seed polymerization process. Examples of initiators that can be used are: potassium persulfate; ammonium persulfate; p-methane hydroperoxide/sodium sulfoxylate formaldehyde/ferrous sulfate; cumene hydroperoxide/sodium sulfoxylate formaldehyde/ferrous sulfate; p-methane hydroperoxide/sodium bisulfate/ferrous sulfate; potassium persulfate/sodium bisulfite/ferrous sulfate; potassium persulfate/sodium bisulfite; a,a'-azobisisobutyronitrile; and hydrogen peroxide/dextrose/ferrous sulfate.

Examples of emulsifiers that can be used are: sodium lauroyl sarcosinate; disproportioned rosin acid salt; sodium dodecyl benzene sulfonate; ammonium nonyl phenol polyglycol ether sulfate; salt of polyethyleneoxy phosphate ester; potassium oleate; sodium dioctyl sulfosuccinate; sodium dodecyldiphenyl oxide disulfonate; sodium oleoyl isopropanolamide sulfosuccinate; and sodium lauryl sulfate.

The resin particles of latices produced according to the seed polymerization process can be characterized as being chemically and physically homogeneous. As to the chemical homogeneity of the particles, the ratio of the constituent monomers are substantially the same from particle to particle. As to physical homogeneity, the size of the particles are relatively uniform. For example, with latices having an average particle size in the range of about 1,000 to about 3,500 A, the deviation in particle size from the average is a maximum of about ±200 A.

Exemplary properties of latices produced by the seed polymerization process are as follows: surface tension within the range of about 40 to about 65 dynes/cm; pH within the range of about 4 to about 8.5; and solids content within the range of about 45 to about 55 wt. %. The seed polymerization process can be conducted utilizing a relatively small amount of emulsifier, for example, an amount within the range of about 1 to about 4% based on the resin solids.

The polymerization process described in U.S. Pat. No. 3,397,165 is exemplary of a seed polymerization process. It should be understood that latices containing resin particles which are substantially uniform in physical and chemical makeup can be produced according to other available techniques.

The amount of the resin comprising the coating composition of the present invention can vary over a wide range. The lower concentration limit of the resin particles in the composition is dictated by the amount of resin needed to provide sufficient material to form a resinous coating. The upper limit is dictated by the amount of resin particles which can be dispersed in the acidic aqueous composition. In general, the higher the amount of resin particles in the composition, the heavier the coating formed, other factors being the same. Although coating compositions can be formulated with about 5 to about 550 g/l of resin solids, the amount range of the resin solids will tend to very depending on the other ingredients comprising the composition and also on the specific latex or resin used.

Latices for use in the composition of the present invention are available commercially. Examples of such latices are sold under the trademarks Darex 637 and Darex 510.

A preferred latex contains particles of resin (A) above, which particles are chemically and physically homogeneous. The resin particles of the preferred latex are prepared from styrene, butadiene, vinylidene chloride and methacrylic acid. In addition, the emulsifier content of the preferred latex is about 1 to about 4% based on the resin solids and comprises at least 90 wt. %, most preferably 100 wt. % of an anionic emulsifier such as a sulfonate, for example, sodium dodecylbenzene sulfonate, or a sulfosuccinate, for example, sodium, oleoyl isopropanolamide sulfosuccinate, or a mixture thereof.

As to other ingredients comprising the coating composition, U.S. Pat. Nos. 3,585,084 and 3,592,699 disclose the use of a variety of acids (for example, hydrofluoric, nitric, phosphoric, and acetic) and the use of a variety of oxidizing agents (for example, hydrogen peroxide, dichromate, nitrite, nitrate and chlorate). The ingredients are present in amounts which are effective in dissolving metal from the metallic surface immersed therein to form in the composition ions in a sufficient amount to cause the resin particles to deposit on the metallic surface in such a manner such that the resinous coating grows with time. (Exemplary compositions disclosed in said patents are effective in dissolving at least about 25 mg/sq.ft. of an iron surface within the first minute of time the surface is immersed in the composition.) For this purpose, the composition contains sufficient acid to impart a pH of less than 7 to the composition, preferably to impart a pH thereto within the range of about 1.6 to about 3.8. The oxidizing agent is present in an amount sufficient to provide an oxidizing equivalent of at least about 0.01 per liter of the composition. The preferred composition described in the aforementioned patents comprises about 5 to about 550 g/l of resin solids, hydrofluoric acid in an amount sufficient to impart to the composition a pH within the range of 1.6 to about 3.8 and equivalent to about 0.4 to about 5 gl of fluoride, and as an oxidizing agent, dichromate or most preferably hydrogen peroxide, in an amount to provide about 0.01 to about 0.2 of oxidizing equivalent per liter of composition.

U.S. Pat. No. 3,709,743 discloses an acidic aqueous coating composition having a resin solids content of about 2 to about 65 wt. %, preferably about 5 to about 20 wt. %, and nitric acid in an amount of about 0.1 to about 5 wt. %, preferably about 0.5 to about 2 wt. %, with the preferred pH of the composition being below about 2.

South African Pat. No. 72/1146 discloses an acidic aqueous coating composition containing about 5 to about 550 g/l of resin solids, a soluble ferric-containing compound in an amount equivalent to about 0.025 to about 3.5 g/l ferric ion, and preferably about 0.3 to about 1.6 g/l of ferric ion, and acid in an amount sufficient to impart to the composition a pH within the range of about 1.6 to about 5.0. Optionally an oxidizing agent may be used in an amount to provide from about 0.01 to about 0.2 oxidizing equivalent per liter of composition. Examples of the aforementioned ferric-containing compounds are ferric fluoride, ferric nitrate, ferric chloride, ferric phosphate and ferric oxide. Examples of acids are sulfuric hydrochloric, hydrofluoric, nitric, phosphoric, and organic acids, including, for example, acetic, chloracetic and trichloracetic. Examples of oxidizing agents are hydrogen peroxide, dichromate, permanganate, nitrate, persulfate and perborate. The preferred composition is described as being prepared from about 5 to about 550 g/l of resin solids, about 1 to 5 g/l of ferric fluoride trihydrate, and hydrofluoric acid in an amount sufficient to impart to the composition a pH within the range of about 1.6 to about 5.0.

Belgian Patent of Addition No. 811,841 discloses a coating composition containing about 5 to about 550 g/l of resin solids, a metal-containing compound which is soluble in the composition and acid to impart to the composition a pH within the range of about 1.6 to about 5.0. Examples of the soluble metal-containing compound are silver fluoride, ferrous oxide, cupric sulfate cobaltous nitrate, silver acetate, ferrous phosphate, chromium fluoride, cadmium fluoride, stannous fluoride, lead dioxide, and silver nitrate. The metal compound is present in the composition in an amount within the range of about 0.025 to about 50 g/l. Examples of acids that can be employed are sulfuric, hydrochloric, hydrofluoric, nitric and phosphoric and organic acids such as acetic, chloracetic and trichloracetic. The use of hydrofluoric acid is preferred. Optionally, an oxidizing agent may be used in an amount sufficient to provide from about 0.01 to about 0.2 of oxidizing equivalent per liter of composition. Examples of oxidizing agents are hydrogen peroxide, dichromate, permanganate, nitrate, persulfate and perborate.

British Pat. No. 1,241,991 discloses an acidic aqueous coating composition containing an oxidizing agent and solid resin particles stablized with an anionic surfactant. The composition is substantially free of nonionic surfactant. The resin particles comprise about 5 to about 60 wt. %, preferably about 10 to about 30 wt. %, of the composition. The anionic surfactant comprises about 0.5 to about 5 wt. %, preferably about 2 to about 4 wt. %, based on the weight of the resin. Examples of anionic surfactants are the alkyl, alkyl/aryl or naphthalene sulfonates, for example sodium dioctyl sulphosuccinate and sodium dodecylbenzene sulfonate. The oxidizing agent is described as being of the kind commonly known as a depolariser, and preferably is present in the composition in an amount of about 0.02 to about 0.2 N. Examples of oxidizing agents are hydrogen peroxide, p-benzoquinone, p-nitrophenol, persulfate and nitrate. Acids such as phosphoric, hydrochloric, sulfuric, acetic, trichloracetic and nitric are used to impart to the composition a pH of referably less than 5, most perferably less than 3.5.

The aqueous phase of the coating composition of the present invention contains surfactant in an amount below the critical micelle concentration (hereafter referred to as "CMC"). Preferably the aqueous phase of the composition contains little or no surfactant.

By way of background, it is noted that the addition of surfactant to water results in lowering of the surface tension thereof, with the rate of decrease initially being very rapid at relatively low surfactant concentration. As the concentration of the surfactant is increased, the surface tension of the water begins to decrease more slowly and becomes substantially constant notwithstanding the incorporation of additional amounts of surfactant to the water.

Curves which exemplify this are well known. In such curves, surface tension (in dynes/cm) is plotted as the ordinate and the concentration of surfactant is plotted logarithmically as the abscissa. Such curves usually have three distinct characteristics. The slope of the curve is initially very steep as the surface tension decreases rapidly with relatively small increases of concentration of surfactant. The curve then goes through an inflection point where the surface tension decreases relatively slowly with somewhat larger increases in surfactant concentration. Eventually the curve becomes asymptotic as substantially no decrease in surface tension is realized notwithstanding larger increases in surfactant concentrations.

At the low concentrations of surfactant which result in substantial decreases in surface tension, the surfactant is present in the aqueous phase in the form of individual molecules which are relatively mobile. As the concentration of the surfactant is further increased the molecules of surfactant begin to associate to form clusters on micelles. In addition to the micelles, individual molecules of surfactant are also present in equilibrium with the micelles. The concentration at which the micelles begin to form is termed the "critical micelle concentration". In a plot of surface tension versus concentration, the CMC corresponds to that point in the curve at which the surface tension becomes minimal.

It is noted that the above discussion concerns the effect of a surfactant on water. In general, the statements made are also applicable to the effect of surfactant on a latex and on coating compositions of the type to which this invention relates.

There follows an explanation of why it is believed the use of coating compositions having little or no surfactant in the aqueous phase is advantageous.

It is believed that a coating composition which contains a relatively high amount of surfactant contains the following species: (1) resin particles having adsorbed thereon surfactant which maintains the particles in the dispersed state; (2) micelles of surfactant in the aqueous phase of the composition; and (3) individual molecules of surfactant in the aqueous phase. Of these three species, the most mobile species is the individual molecules of surfactant.

It is believed that in the use of such a composition, the aforementioned mobile individual molecules of surfactant preferentially react with the metal substrate to form a layer which tends to deter the continuous build-up of resin particles on the metallic substrate. By way of further explanation, it is noted that in the case of an anionic surfactant of the type typically used in latices, the surfactant molecule comprises hydrophobic portion and negatively charged hydrophilic portion. It is believed that the negatively charged portion of the mobile individual molecules of surfactant reacts with the metallic substrate leaving the hydrophobic portion of the molecule oriented away from the substrate. It is noted that other surfactant molecules are adsorbed on the resin particles with the hydrophilic portion thereof oriented away from the particles. Inasmuch as the hydrophobic portion of the molecules on the substrate has little affinity for the hydrophilic portion of the surfactant molecules adsorbed on the resin particles, relatively rapid build-up of coating on the substrate is deterred.

It is believed that a coating composition that contains little or no surfactant in the aqueous phase functions to form coatings which build up in thickness rapidly for the following reasons. In such compositions, substantially all of the surfactant molecules are associated with the resin particles, with the hydrophobic portion of the molecule adsorbed to the surface of the particle and the negatively charged hydrophilic portion oriented away from the particle. Since the surfactant molecules have a preferential affinity for the resin particles, the concentration of individual surfactant molecules in the aqueous phase of the composition is minimal and below the CMC. (Adding enough surfactant to a "surfactant-poor composition" would result in saturation of the resin particles with adsorbed surfactant and increased amounts, in the aqueous phase, of individual surfactant molecules which at still higher concentration lead to the formation of micelles.) The aqueous phase of the composition contains relatively few or no individual surfactant molecules which would tend to deter rapid continuous build-up of the resin coating, as described above.

As to the build-up of the resin coating, it is believed that the negatively charged hydrophilic portion of the surfactant molecules which are adsorbed to the resin particle reacts with the metal substrate. Continued growth of the resinous coating is effected through what is believed to be a bridging type mechanism. For example, when coating an iron substrate, iron which is dissolved by the composition reacts with the negatively charged portion of the surfactant molecules that have not reacted with the metallic substrate, thereby bridging or joining different resin particles through the adsorbed surfactant molecules. This can be pictured as follows when using a sulfonate such as sodium dodecyl benzene sulfonate:

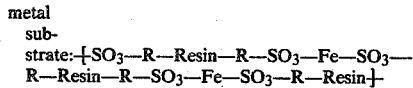

metal
sub-
strate:-[SO$_3$—R—Resin—R—SO$_3$—Fe—SO$_3$—
R—Resin—R—SO$_3$—Fe—SO$_3$—R—Resin-]-

It should be understood that the aforementioned is a simplified illustration of the mechanism of continued coating growth. The growth of the coating can continue by the same type mechanism in three dimensions.

It is believed that the mechanism described above also contributes to the corrosion resistant properties of the coating as a result of the bonds which link the hydrophilic portion of the surfactant/resin particle species to the metal substrate.

Preferably the concentration of surfactant in the aqueous phase of the composition is below the surfactant concentration which corresponds to the inflection point on a graph of surface tension versus the logarithm of surfactant concentration in the composition. It should be noted that the CMC and inflection point surfactant concentration of coating compositions of the present invention can be determined by conventional means. For example, a ring-type tensiometer may be used to determine the surface tension of compositions at various levels of surfactant concentration.

Accordingly, it should be understood that when formulating the coating compositions of the present invention, there should not be used ingredients which result in a surfactant concentration in the aqueous phase of the composition above the CMC. It is noted that most, but not all latices contain surfactants (also commonly referred to as "emulsifiers" or "stabilizers") for maintaining the resin particles in their dispersed state. In accordance with the present invention, there should be used latices, the addition of which to the coating composition results in a surfactant concentration in the aqueous phase below the CMC, preferably below the aforementioned inflection point surfactant concentration. In general, such latices will have a relatively high surface tension, that is, at least about 45 dynes/cm. Examples of latices which can be used are those prepared by the seed polymerization process described in detail hereinabove.

It is noted that there are available self-stabilizing latices, that is, latices which contains in the polymer chain groups that are effective in maintaining the polymeric particles dispersed in the aqueous phase of the latex. Such latices do not require the presence of surfactant to maintain the particles in their dispersed state. Latices of this type generally have a surface tension very close to that of water (about 72 dynes/cm). It has been observed that such latices form coatings which build up at a relatively fast rate.

As discussed in detail below, the coating composition of the present invention can include pigments. Many pigments are available in aqueous dispersions which may include surfactants or dispersing agents for maintaining the pigment particles in dispersed state. When utilizing such pigment dispersions in the composition of the present invention, they should be selected so that the surfactant concentration in the aqueous phase of the composition is below the CMC, preferably below the aforementioned inflection point surfactant concentration. Such pigmented compositions are illustrated in examples herein.

A description of other aspects of the overall coating process follows.

Various factors should be taken into account in determining whether the metallic surface should or should not be cleaned, and the extent of cleaning, prior to contact with the coating composition, including, for example, the nature of foreign materials (if any) on the surface and the desired quality of the coating. Foreign materials which are present on the metallic surface can lead to the formation of coatings which are not uniform. Also, the adhesion and corrosion resistant properties of the resinous coating can be affected adversely as a result of the presence on the metallic surface of foreign materials during the coating step. Generally speaking, improved quality coatings can be consistently obtained the cleaner the surface. Excellent results can be achieved consistently by subjecting the metallic surface to a cleaning operation which results in a surface on which there can be formed a water break-free film. The selection of the cleaning agent and mode of application thereof to the metallic surface will depend on the type of foreign materials present on the metallic surface. Available cleaning agents can be used in accordance with known technology. Thus, depending on the type of soil or foreign materials which are present, acidic, alkaline or other cleansing agents can be used. By way of example, dilute phosphoric acid can be used to clean lightly rusted parts and hot alkaline compositions can be used for the removal of oils, greases, fingerprints and other organic deposits.

After the metallic surface has been cleaned, it may or may not be water rinsed prior to immerising the metallic surface in the coating composition. Water rinsing the surface removes therefrom foreign materials, for example, residual cleaning agent, which may tend to adversely affect the coating operation. For example, foreign materials carried into the coating composition may have adverse effects thereon. Whether or not a water rinse should be used in a particular application can be best determined by taking into account the quality of the coatings desired and observing whether or not unrinsed surfaces adversely affect the coating bath and coating quality. To avoid or minimize such adverse effects, it is recommended that the clean surface be rinsed with deionized water for a sufficient period of time to remove foreign materials therefrom and that most of the rinse water be removed from the surface (for example, by allowing it to drain therefrom) before the surface is immersed in the coating bath.

As mentioned above, the longer the metallic surface is immersed in the coating composition, the greater the buildup in coating thickness. Examples below illustrate coating thicknesses that can be obtained for the use of specific compositions within the scope of the present invention. It is believed that for most applications, desired coating thicknesses can be obtained by immersing the metallic surface in the composition for a period of time within the range of about 30 seconds to about 3 minutes. However, it should be understood that longer or shorter periods of time can be used. Work has shown that over a 3 day period there was a buildup of resinous coating having a thickness of about 125 mils.

Agitating the composition aids in maintaining it uniform. Also, agitation of the composition is effective in improving the uniformity of the coatings formed.

Other factors held constant, heating of the coating composition will result in heavier coatings. For example, a composition having a temperature of about 35° F. formed a coating having a thickness of about 0.8 mil, whereas at a temperature of about 100° F., the coating formed had a thickness of about 1.1 mils. Satisfactory results can be obtained by operating the coating process at ambient temperature.

It has been found that coating composiitons within the scope of the present invention are effective in forming coatings which upon being immediately withdrawn from the coating composition are initially adherent to the metallic substrate. For example, such coatings resist being removed from the substrate when they are rinsed with running tap water immediately after being withdrawn from the coating composition.

Water rinsing the coated surface after it has been withdrawn from the composition, and before significant drying takes place is effective in removing therefrom residuals such as acid and other ingredients of the bath that adhere to the coating surface. If such residuals are allowed to remain on the coated surface, they may change or adversely affect the quality of the coating. For a specific application, a determination can be made as to whether the residuals cause adverse effects which are not tolerable. If they do, they should be removed, for example, by water rinsing with tap or deionized water. If they do not, this step of removing them can be avoided.

Upon withdrawal from the coating bath, the coated surface has thereon a superficial layer of coating composition that is dragged out of the bath. This layer can be removed by rinsing the coated substrate. Upon partially or completely air drying or baking the coating, the superficial layer adheres to the underlying and initially adherent coating in a manner such that it is capable of withstanding water rinsing.

Air drying at room temperature for a short time, for example, about 10 to about 60 seconds, are exemplary conditions which result in adherence of the superficial layer to the underlying coating.

If desired, the corrosion resistant properties of the coated surface can be improved by contacting the coated surface with an acidic aqueous rinse solution containing hexavalent chromium. Such rinse solutions can be prepared from chromium trioxide or a water soluble dichromate or chromate salt, for example, ammonium, sodium and potassium salts. There can also be used a chromium composition obtained by treating a concentrated aqueous solution of chromic acid with formaldehyde to reduce a portion of the hexavalent chromium. This type of rinse composition, which is described in U.S. Pat. No. 3,063,877 to Schiffman, contains chromium in its hexavalent state and reduced chromium in aqueous solution. By way of example, such an aqueous rinse composition can comprise a total chromium concentration within the range of about 0.15 g/l (expressed as $CrO_3$) to about 2 g/l, wherein from about 40–95% of the chromium is in its hexavalent state and the remainder of the chromium is in its reduced state.

The mere presence of hexavalent chromium in the treatment solution appears to improve the corrosion resistant properties of the coating, with increasing amounts giving increased improvements. Accordingly, the amount used will in general be governed by the corrosion resistant properties required for the specific application. It is recommended that at least about 0.01 g/l of hexavalent chromium be used and that the amount be adjusted upwardly as required, if necessary.

Following any rinse steps employed after the coated surface is withdrawn from the composition, the coating should be dried. Fusion of the resinous coating renders it continuous, thereby improving its resistance to corrosion and adherence to the underlying metallic surface.

The conditions under which the drying and/or fusion operation is carried out depend somewhat upon the type of resin employed. In general, heat will be required to fuse the resin. The corrosion resistant properties of coatings fused at elevated temperature have been observed to be better than coatings which have been air dried. However, there are applications where air dried coatings can be used satisfactorily. The fusion of the coating should be carried out under temperature and time conditions which do not adversely affect the desired properties of the coating. Exemplary conditions used in fusing coatings produced according to the present invention are temperatures within the range of about 100 to about 200° C. for periods of time within the range of about 10 to about 30 minutes, depending on the mass of the coated part. Baking the coating for a period of time until the metallic surface has reached the temperature of the heated environment has been used effectively.

In preferred form, the coating composition of the present invention comprises about 50 to about 100 g/l of the resin, and particularly one which is cross-linked to the extent that it is insoluble in organic solvents such as toluene, xylene, N-dimethyl formamide, O-dichlorobenzene and N-methyl pyrrolidone. The preferred composition is prepared from a ferric-containing compound, most preferably ferric fluoride, in an amount such that it contains the equivalent of about 0.5 to about 3.5 g/l of ferric iron. In addition, about 0.2 to about 5 g/l of HF is used in preparing the composition, and the pH of the composition is within the range of about 1.6 to about 4.

It is believed that the composition of the present invention will be used most widely in applications where it is desired to apply pigmented coatings to the metallic surface. For this purpose, suitable pigments are included in the composition. Examples of pigments that can be used are carbon black, phthalocyanine blue, phthalocyanine green, guinacridone red, Hansa yellow, and benzidine yellow.

The pigment should be added to the composition in an amount which imparts to the coating the desired color and or the desired depth or degree of hue. It should be understood that the specific amount used will be governed by the specific pigment used and the color of coating desired.

In forming pigmented black coatings, excellent results have been achieved by using a composition wherein the resin particles are dispersed by an anionic emulsifier, for example, a sulfonate, and wherein the black pigment is added to the composition in the form of an aqueous dispersion of a black pigment dispersed by a nonionic emulsifier, for example, an ethoxylated alkyl phenol. Excellent results have been achieved by using such an aqueous dispersion in an amount such that the composition contains about 0.2 to about 3 g of furnace black/100 g of resin solids.

Colored coatings can be produced also by the use of dyes, examples of which include, rhodamine derived dyes, methyl violet, safranine, anthraquinone derived dyes, nigrosine and alizarin cyanine green. These are but a few examples of dyes that can be used.

The ingredients comprising the composition should be admixed in a manner such that significant coagulation of the resin particles is avoided. In this connection, the sequence of admixing the various ingredients comprising the composition should be taken into account. For example, in preparing an unpigmented form of the preferred composition of the present invention, the following mixing procedure results in the formation of a composition in which little or no coagulation of the resin particles is encountered. The latex is diluted by adding water thereto with stirring. Thereafter, a solution of acid and other ingredients, for example, a solution of HF and FeF$_3$ is added with stirring. Continuous stirring helps to prevent localized high concentration of acid which may tend to cause coagulation. In preparing a pigmented form of the composition of the present invention, the following mixing procedure has been used in formulating a composition in which little or no coagulation of the solids is encountered. Water, preferably deionized water, can be added to a pigment dispersion to improve its flow, if necessary. The latex is then added to the pigment dispersion with stirring and water can then be added to dilute the composition as needed. Thereafter a solution of the other ingredients can be added.

In preparing a bath of pigmented coating composition for use on an industrial scale, it is preferred that the bath be prepared by admixing:

(A) an aqueous concentrate comprising about 350 to about 550 g/l of the resin particles and about 10 to about 550 g/l of pigment; and (B) an aqueous concentrate prepared from about 0.4 to about 210 g/l of HF and a water soluble ferric-containing compound in an amount equivalent to about 1 to about 100 g/l of ferric iron.

The bath can be prepared by stirring water into concentrate (A) and thereafter admixing therewith the required amount of concentrate (B) with stirring to provide a homogeneous composition.

Preferred operating steps for forming resinous coatings on steel surfaces, for example, car frames made from hot rolled steel, which coatings provide excellent corrosion resistance after being subjected to salt spray (ASTM D117) for at least 168 hours include the following:

(A) cleaning the steel surface, preferably to the extent that a water break-free film can be formed on the surface;

(B) water rinsing the cleaned surface to remove therefrom residual cleaning agent;

(C) immersing the surface in the preferred pigmented coating composition, as described above, for a period of time of about 45 to about 90 seconds to form on the surface a coating having a thickness of about 0.7 to about 1.3 mil;

(D) withdrawing the coated surface from the composition, and either immediately or after a partial air dry of about 30 to about 60 seconds, water rinsing the coated surface to remove therefrom residual coating composition and superficial coating film;

(E) contacting the coated surface with an aqueous chromium rinse solution comprising about 1 to about 3 g/l of total chromium, with about 0.75 to about 2.25 g/l being hexavalent chromium and the remainder of the chromium being in the reduced state for about 10 to about 45 seconds; and (F) baking the coated surface at a temperature within the range of about 120° C. to about 180° C. for a period of time of about 10 to about 30 minutes.

EXAMPLES

Examples below are illustrative of the present invention. Comparative examples are set forth also.

Unless stated otherwise, the steel panels used in the work described below were unpolished Q-panels, 3"×4", and "%" means percent by weight based on the total weight of the stated composition.

Example No. 1

The composition of this example is illustrative of a composition within the scope of the present invention. The following acidic aqueous coating composition was prepared by combining

| Ingredients | Amounts |
| --- | --- |
| latex containing about 54% solids | 180 g |
| ferric fluoride | 3 g |
| hydrofluoric acid | 2.3 g |
| black pigment dispersion | 5 g |
| water | to make 1 liter |

The resin of the latex used in the above composition comprised about 62% styrene, about 30% butadiene, about 5% vinylidene chloride and about 3% methacrylic acid. A film formed from the resin is soluble in refluxing chlorobenzene to the extent of about 13%. That the resin is cross-linked is indicated by its insoluility in Soxhlet extraction with chlorobenzene. The water soluble content of the latex is about 2% based on the weight of dried resin, with the water soluble content comprising about 10% sodium phosphate, about 13% sodium oleoyl isopropanolamide sulfosuccinate and about 75% sodium dodecylbenzene sulfonate, the first mentioned ingredient being a buffering agent used in preparing the latex, and the last 2 metioned ingredients being emulsifiers. The pH of the latex was about 7.8 and the surface tension thereof about 45-50 dynes/cm. The average particle size of the resin was about 2,000 A.

The black pigment dispersion used in the above composition is an aqueous dispersion having a total solids content of about 36%. Carbon black comprises about 30% of the dispersion. It has a pH of about 10-11.5 and a specific gravity of about 1.17. The dispersion contains a nonionic dispersing agent for the solids, and is sold under the trademark Aquablak 115. Unless stated otherwise, the black pigment dispersion used in the examples is Aquablak 115.

A steel panel was immersed in the composition of Example 1 for 90 seconds. After withdrawal from the composition, the coated panel was allowed to dry partially for about 60 seconds in air, and thereafter it was rinsed with running tap water, and then immersed for 30 seconds in a solution of about 9 g/l of $Na_2Cr_2O_7 \cdot 2H_2O$. Thereafter, the coated panel was baked for 10 minutes in an oven at 170° C. The thickness of the coating on the panel was 1.2-1.4 mil. Corrosion resistant properties of the coated panel are set forth in Table 1 below along with those of panels coated with comparative compositions.

The compositions of the next seven examples are presented for comparative purposes. Each of the comparative compositions was like that of the composition of Example 1, except for the use therein of a different latex in an amount to give approximately the same solids content. The latices used in the comparative compositions are described below.

Latex

Example A—styrene/butadiene latex sold under the trademark Dylex R SKD 1123; described by manufacturer as being an emulsifier-free latex.

Example B—butadiene-acrylonitrile (medium acrylonitrile content) latex sold under the trademark Hycar 1870X4; pH—7.5; surface tension 62 dynes/cm; 49% solids; and described by manufacturer as being essentially free of emulsifier and other water sensitive ingredients.

Example C—carboxy-modified styrene-butadiene copolymer latex sold under the trademark Good-rite 2570X1; carboxy content—0.033 equivalent parts/100 parts of rubber; pH—6.5; about 50% solids; average resin particle size—3000 A; specific gravity of latex—1.0; and the resin being reported by manufacturer as being cross-linkable by metallic salts or oxides.

Example D—heat-reactive carboxy modified styrenebutadiene copolymer latex containing synthetic anionic emulsifier and sold under the trademark Good-rite 2570X5; pH—6.5; about 40% solids; surface tension—reported as 40 dynes/cm, measured at 33 dynes/cm; glass transition temperature—30° C; specific gravity of latex—1.0.

Example E—vinyl chloride latex sold under the trademark Pliovic 400; surface tension—36; dynes/cm;

Example F—acrylic latex sold under the trademark Hycar 2600X 112; 50% solids; minimum film temperature—150° F.; glass transition temperature—29° C.; surface tension—45 dynes/cm.

Example G—latex stabilized with anionic emulsifier and containing acrylic resin with a small amount of vinyl chloride and sold under the trademark Hycar 2600X189; 49% soilds; pH—2.0; surface tension—43 dynes/cm; glass transition temperature—32° C.; heat activated curing at 250°-275° F.

The comparative compositions of Examples A to G above were used to coat steel panels by the procedure described in connection with the use of the composition of Example No. 1, except that the panels coated with the compositions of Examples E to G were not rinsed or treated with the $Na_2Cr_2O_7.2H_2O$ solution, before being baked. Coating thicknesses and results of salt spray tests are summarized in Table 1 below. The salt spray test used was ASTM D-117, with the coating being scribed. At the completion of the salt spray tests, the panels were rated on a numerical scale ranging from 10 to 0, the number 10 representing no failure, that is, the appearance of the scribed coated panel before and after the salt spray test was basically the same, and the number 0 representing a coating failure of 1" or more from the scribe. The panels were subjected to the salt spray test for 168 hours.

TABLE 1

| Composition | Coating Thickness in mil | Salt Spray Rating |
| --- | --- | --- |
| Ex. No. 1 | 1.2-1.4 | 8 |
| Ex. A | 0.7 | 2 |
| Ex. B | 0.6 | 0 |
| Ex. C | 1.0 | 2 |
| Ex. D | n.m.* | 0 |
| Ex. E | 0.4** | n.m. |
| Ex. F | 0.3 | n.m. |
| Ex. G | 0.55** | n.m. |

*not measured
**thickness after 3 min. immersion in composition; after 1 min. immersion - 0.15 mil In work done in connection with the development of the present invention, it has been found that the corrosion resistant properties of coatings formed from various compositions within the scope of the present invention are improved quite substantially when the uncured coating is contacted with an aqueous chromium solution of the types mentioned above. For some applications in which no chomium rinse is used, it has been found that coatings formed from compositions formulated from latices outside the scope of the present development may have better corrosion resistant properties than coatings formed from compositions formulated from latices within the scope of the present development. In general, the corrosion resistant properties of such coatings are of a level which would preclude their use for some applications. However, when utilizing a chromium rinse, coatings formed from various compositions within the scope of the present development have their corrosion resistant properties increased to a more significant extent than coatings formed from compositions formulated from latices outside the scope of the present development.

The next group of examples shows the use of coating compositions within the scope of the present invention to coat metallic surfaces for varying periods of time and the effect on coating thicknesses of using compositions having different resin concentrations. The composition was prepared from 1.8 g of $FeF_3$, 1.4 g of HF, 5 g of black pigment dispersion, the amount of latex (Darex 637-L) referred to in Table 2 below and sufficient deionized water to make one liter. Steel panels were immersed in the compositions for the times indicated in Table 2. After being withdrawn from the compositions they were dried partially in air for about one minute. The coated panels were then immersed in tap water for about 30 seconds, and the coated panels were baked for about 10 minutes in an oven having a temperature of about 163° C.

TABLE 2

| Ex. No. | Latex, grams | Approximate % Resin | Approximate Coating Thickness (in Mil) After Immersion-Coating for: | | | |
|---|---|---|---|---|---|---|
| | | | 30 sec. | 60 sec. | 90 sec. | 120 sec. |
| 2 | 54 | 3 | 0.35 | 0.45 | 0.51 | 0.6 |
| 3 | 90 | 4 | 0.45 | 0.7 | 0.85 | 0.94 |
| 4 | 126 | 6 | 0.6 | 0.8 | 0.92 | 1.15 |
| 5 | 180 | 9 | 0.65 | 0.9 | 1.3 | 1.34 |

As can be seen from Table 2, the longer the time of immersion in the coating bath, the greater the thicknesses of the coatings formed, and the higher the resin concentration of the composition, the greater the thicknesses of the coatings formed.

Hot rolled steel surfaces were subjected to the same coating process as described in connection with the compositions of Example Nos. 2 to 5 above, except that the times of immersion in the coating bath were either 30 or 90 seconds. The coating thicknesses obtained are set forth in Table 3 below.

TABLE 3

| Ex. No. | Coating Composition | 30 seconds | 90 seconds |
|---|---|---|---|
| 6 | Ex. No. 2 | .22 | .5 |
| 7 | Ex. No. 3 | .34 | .72 |
| 8 | Ex. No. 4 | .45 | .84 |
| 9 | Ex. No. 5 | .5 | 1.0 |

The next group of examples shows the use of varying amounts of pigment.

EXAMPLE NOS. 10 to 13

Four compositions within the scope of the present inventin were prepared by admixing 180 g of the latex used in Example No. 1, 3 g of ferric fluoride, 2.3 g of HF and either 0, 2 g, 5 g or 10 g of a black pigment dispersion and sufficient water to make 1 liter. Steel panels were immersed in the compositions for 1 minute, withdrawn therefrom, allowed to partially dry in air for about 1 minute, rinsed with tap water for about 30 seconds and then immersed in an aqueous chromium solution for 30 seconds. The coated panels were then baked in an oven having a temperature of about 170° C. for 10 minutes. The thicknesses of the coatings ranged from 0.8 ml to 1.1 ml. The corrosion resistance properties of the coated panels were similar after they were subjected to 336 hours in salt spray (ASTM D-117).

The next two examples show the coating of terneplate (steel coated with an alloy of lead and tin) with a composition within the scope of the present invention.

EXAMPLE NO. 14

A coating composition was prepared by admixing 200 ml of Darex 637-L latex, 3 g of ferric fluoride, 2.3 g of HF, 5 g of a black pigment dispersion and sufficient deionized water to make 1 liter. A piece of terneplate was immersed in the composition for about 1 minute. Upon removal from the composition, the coated surface was allowed to dry partially in air for 1 minute and was then baked in an oven having a temperature of 160° C. for about 10 minutes. The thickness of the coating was about 1.4 mils.

EXAMPLE NO. 15

The same procedure described in Example No. 14 was followed except that the terneplate was immersed in the composition for about 2 minutes. The thickness of the coating was about 1.8 mils.

Test evaluations have shown that terneplate coated with compositions within the scope of the present invention and rinsed with a chromium solution has excellent corrosion resistant properties after 336 hours of salt spray and that the adhesion properties of the coating are excellent.

The next two examples show the use of a composition prepared from ferric nitrate, HF, latex and pigment.

EXAMPLE NO. 16

A composition was prepared by admixing the following:

| | Amounts |
|---|---|
| latex of Example No. 1 | 180 g |
| $Fe(NO_3)_3 \cdot 9H_2O$ | 10.8 g (1.5 g Fe) |
| hydrofluoric acid | 2.1 g |
| black pigment dispersion (Aquablak 115) | 5.0 g |
| deionized water | to make 1 liter. |

The ferric nitrate was predissolved in 100 ml of water and the resulting solution was added to the other ingredients which had been previously admixed. There was some coagulation of the resin when the ferric nitrate solution was added. A steel panel was immersed in the composition for 2 minutes, withdrawn therefrom and immediately rinsed with water. Thereafter the coated panel was baked for 10 minutes at 170° C. The thickness of the resinous coating formed on the panel was 0.75 ml.

EXAMPLE NO. 17

This composition was like that of Example No. 16, except that an aqueous solution of ferric nitrate and HF was prepared and added to the other ingredients. There were no signs of coagulation of the resin. The use of this composition, as described above, resulted in the formation of a coating having a thickness of 0.8 ml.

The next example shows the use of a dye in a composition within the scope of the present invention.

EXAMPLE NO. 18

A composition like that of Example No. 1 was prepared, except that in place of the black pigment dispersion, there was used 1 g of Rhodamine T, a red dye. A steel panel was immersed in the composition for 2 minutes, withdrawn therefrom and immediately rinsed with water, and thereafter baked for 10 minutes in an oven having a temperature of 170° C. A very uniform, glossy, bluish-red coating was formed on the panel.

The next group of examples also shows the use of a coating composition within the scope of the present invention to coat steel panels for different periods of times and the formation of heavier coatings the longer the panels are immersed in the compositions. The composition was prepared from 180 g of the latex used in Example No. 1, 6 grams of ferric fluoride, 4.2 g of HF, 5 g of a black pigment dispersion and sufficient water to make 1 liter of composition.

TABLE 4

| Example No. | Time of Immersion, Min. | Coating Thickness, Mil. |
|---|---|---|
| 19 | 1 | 1.1 |
| 20 | 2 | 1.8 |
| 21 | 5 | 3.5 |

After panels were withdrawn from the above compositions, they were immediately water rinsed and then immersed for 30 seconds in an aqueous solution of about 9 g/l of $Na_2Cr_2O_7.9H_2O$. Thereafter, the panels of Example Nos. 19 and 20 were baked for 10 minutes in an oven having a temperature of 170° C. These panels were subjected to an impact test. (The coated panel is impacted by a falling ½"-diameter ball with a given force measured in inch-pounds to deform the panel. After impact, both sides of the deformed surface are inspected for loose or cracked coating. If none is evident, the reverse side of the panel is covered with conventional transparent pressure sensitive adhesive tape at the area of deformation. The tape is then pulled off the panel and examined for pieces of coating.) The panel of Example No. 19 passed a 160 inch-pound test and the panel of Example No. 20 passed a 100 inch-pound test, that is, no coating adhered to the tape. The panel of Example No. 21 was baked for 10 minutes in an oven having a temperature of 110° C., and thereafter was baked for an additional 10 minutes in an oven having a temperature of 170° C. Adherence of the coating to the panel was excellent.

The next example shows the use of a coating composition utilizing $NH_4F.HF$.

EXAMPLE NO. 22

The coating composition was prepared from the following ingredients.

| | Amounts |
|---|---|
| latex used in Example No. 1 | 180 g |
| ferric fluoride | 1.5 g |
| $NH_4F . HF$ | 3 g |
| hydrofluoric acid | 0.2 g |
| black pigment dispersion | 5 g |
| water | to make 1 liter |

The pH of the above composition was 4. A steel panel was immersed in the composition for 90 seconds, withdrawn there-from and immediately rinsed with water, and then baked for 10 minutes in an oven having a temperature of 170° C. A black, uniform, glossy coating having a light texture and a thickness of 0.5–0.7 ml was obtained. There was added to the above composition 4 g of an aqueous solution of 28% $NH_3$ to raise the pH. The use of this composition led to the formation of a thinner coating.

The next group of examples shows the formulation of compositions within the scope of the present invention containing an oxidizing agent, namely $H_2O_2$. The compositions were like those of Example No. 1 above except for the inclusion therein of $H_2O_2$ in the amounts stated in Table 5 below.

TABLE 5

| Ex. No. | $H_2O_2$, g/l |
|---|---|
| 23 | 0.4 |
| 24 | 0.8 |
| 25 | 1.6 |
| 26 | 2.4 |

Steel panels were immersed in the compositions for 2 minutes. After being allowed to dry partially in air for about 1 minute, the coated panels were rinsed with running tap water. Thereafter, the coated panels were immersed in 1% aqueous solution of $Na_2Cr_2O_7$ for 30 seconds and then placed in an oven having a temperature of 170° C. for 10 minutes. After baking, the coated panels were subjected to salt spray tests for 168 hours. Evaluations showed that the panels coated with the compositions of Example Nos. 24 to 26 were entitled to a rating of 10, their corrosion resistance being excellent. The corrosion resistance of a panel coated with the composition of Example No. 23 and also one coated with a composition like Example No. 23, but having no $H_2O_2$ therein, was also good, but not quite as good as those coated with the compositions of Example Nos. 24 to 26.

The next group of examples is illustrative of various latices that can be used in the practice of the present invention. The surface tension of each of the latices is 45 dynes/cm or higher.

TABLE 6

| Latex | Resin | Resin Solids, Wt. % | Average Particle Size of Resin, Angstroms | Particle Size Spread of Resin Particles, Angstroms |
|---|---|---|---|---|
| Latex | 60% butadiene<br>12% acrylonitrile<br>23% vinylidene chloride<br>5% maleic acid | 49 | 1700 | — |
| Latex 2 | 40% isoprene<br>35% styrene<br>10% vinylidene chloride<br>15% octyl acid maleate | 47 | 1950 | 1700–2100 |
| Latex 3 | 40% butadiene<br>60% styrene | 50 | 1665 | 1450–1850 |

TABLE 6-continued

| Latex | Resin | Resin Solids, Wt. % | Average Particle Size of Resin, Angstroms | Particle Size Spread of Resin Particles, Angstroms |
|---|---|---|---|---|
| Latex 4 | 58% butadiene<br>32% styrene<br>3% butylacrylate<br>7% acrylic acid | 54 | 3000 | 2700–3150 |
| Latex 5 | 59% isoprene<br>35% acrylonitrile<br>4% vinylidene chloride<br>2% itaconic acid | 48 | 3200 | — |
| Latex 6 | 60% butadiene<br>30% styrene<br>10% acrylic acid | 51 | 1780 | 1550–1900 |
| Latex 7 | 52% butadiene<br>37% acrylonitrile<br>7% vinylidene chloride<br>4% acrylamide | 51 | 1400 | 1225–1585 |
| Latex 8 | 50% butadiene<br>25% styrene<br>25% acrylonitrile | 47 | 2330 | 2150–2500 |
| Latex 9 | 65% isoprene<br>29% acrylonitrile<br>5% vinylidene chloride<br>1% cinnamic acid | 53 | 2400 | — |
| Latex 10 | 45% butadiene<br>55% acrylonitrile | 53 | 2900 | 2730–3065 |
| Latex 11 | 36% butadiene<br>60% styrene<br>2% vinylidene chloride<br>2% methacrylamide | 48 | 3300 | — |

The following are examples of coating compositions containing latices described above.

| Example No. | Latex | Amount of Resin, g/l | FeF$_3$, g/l | HF, g/l |
|---|---|---|---|---|
| 27 | 1 | 55 | 5.5 | 0.2 |
| 28 | 2 | 84 | 1.0 | 4.0 |
| 29 | 3 | 63 | 3.0 | 3.5 |
| 30 | 4 | 75 | 5.6 | 5.0 |
| 31 | 5 | 98 | 2.0 | 2.0 |
| 32 | 6 | 100 | 4.0 | 3.2 |
| 33 | 7 | 50 | 1.5 | 4.2 |
| 34 | 8 | 73 | 6.3 | 1.0 |
| 35 | 9 | 92 | 5.8 | 3.4 |
| 36 | 10 | 58 | 6.5 | 4.7 |
| 37 | 11 | 86 | 5.0 | 0.8 |

The concentration of surfactant (anionic) in the aqueous phase of each of the above compositions is below the surfactant concentration which corresponds to the inflection point on a graph of surface tension versus the logarithm of surfactant concentration in the composition.

The next example is illustrative of corrosion resistant properties of a coating formed from a composition within the scope of the present invention.

Example No. 38

The following ingredients were used to prepare the composition.

| | |
|---|---|
| latex containing about 55% solids | 180 g |
| ferric fluoride | 3 g |
| hydrofluoric acid | 2.3 g |
| black pigment dispersion | 5 g |
| water | to make 1 liter |

The latex used in the above composition is sold under the trademark Darex 510 L. A steel panel was immersed in the composition for 90 seconds. After withdrawal from the composition, the coated panel was allowed to dry partially for about 60 seconds in air, and thereafter it was rinsed under running tap water, and then immersed for 30 seconds in an aqueous solution of about 9 g/l of $Na_2Cr_2O_7.2H_2O$. Thereafter, the coated panel was baked for 10 minutes in an oven at 170° C. The thickness of the coating on the panel was 1.2–1.4 mils. Upon being subjected to a salt spray test as described above in connection with Example No. 1, the coated panel was rated 9 after 168 hours. Darex 510-L is a latex in which the resin particles are dispersed with an anionic dispersant and which contains about 55% solids. The resin is a carboxylated/styrene/butadiene/vinylidene chloride polymer, with the amounts of the polymerized monomers falling within the preferred ranges set forth above in connection with resin (A). The pH of the latex is about 8.5, the surface tension about 45 dynes/cm and the average particle size of the resin is about 2000 A. According to the manufacturer of the latex, it contains no antioxidant.

The next group of examples is illustrative of the use of various dyes in coating compositions within the scope of the present invention.

Example Nos. 39–42

There were prepared four coating compositions, each prepared from 180 g/l of latex (Darex 637-L), about 3 g/l of ferric fluoride, about 2.3 g/l of HF and 1 g/l of one of the following dyes: (a) safranine T Extra (Dupont); (b) anthraquinone Rubine-R (Dupont); (c) Nigrosine JAD concentrate (General Dyestuff); and (d) alizarin cyanine green CG Extra (Nyanze Color and Chemical Co.). The colors of the coatings formed on steel panels immersed in the compositions were as follows: with dye (a)—very deep red; with dye (b)—pinkish red; with dye (c)—black; with dye (d) green. Darex 637-L is a latex in which the resin particles are dispersed with an anionic dispersant, the resin being a carboxylated/styrene/butadiene/vinylidene chloride polymer, with the amounts of the polymerized monomers falling within the preferred ranges set forth above in connection with Resin (A) above. The pH of the latex, which contains about 48% solids, is about 8. The surface tension of the latex is about 45-50 dynes/cm. The average particle size of the resin is about 2000 A. The latex is described by the manufacturer as containing a non-staining antioxidant.

I claim:

1. An acidic aqueous coating composition of the type which is effective in forming on a metallic surface immersed therein a resinous coating which increases in weight or thickness the longer said surface is immersed in said composition in the absence of any electrical charge on said metallic surface other than that which may be imparted thereto by said composition and characterized by the presence therein of resin particles which are:
    (A) prepared by polymerizing (i) a conjugated diene, (ii) $CH_2=CH-R$ wherein R is an aryl or cyano group, (iii) a vinylidene halide, and (iv) a monoethylenically unsaturated monomer having a functional group selected from the class consisting of amide and carboxyl groups; and/or
    (B) substantially chemically and physically homogeneous,
wherein the concentration of surfactant, if any, in the aqueous phase of said composition is below the critical micelle concentration.

2. A composition according to claim 1 wherein said resin particles are those of (A) and comprise the polymerized constituents of:
    (A) about 25 to about 70 wt. % of said conjugated diene;
    (B) about 5 to about 70 wt. % of said $CH_2=CHR$;
    (C) about 1 to about 50 wt. % of said vinylidene halide; and
    (D) about 0.5 to about 15 wt. % of said unsaturated monomer.

3. A composition according to claim 2 wherein said resin particles comprise the polymerized constituents of:
    (A) about 40 to about 65 wt. % of said conjugated diene;
    (B) about 30 to about 65 wt. % of said $CH_2=CHR$;
    (C) about 3 to about 15 wt. % of said vinylidene halide; and
    (D) about 1 to about 4 wt. % of said unsaturated monomer.

4. A composition according to claim 2 wherein said conjugated diene is butadiene, said $CH_2=CHR$ is styrene, said vinylidene halide is vinylidene chloride and said unsaturated monomer is methacrylic acid.

5. A composition according to claim 3 wherein said conjugated diene is butadiene, said $CH_2=CHR$ is styrene, said vinylidene halide is vinylidene chloride and said unsaturated monomer is methacrylic acid.

6. A composition according to claim 4 wherein said resin particles are dispersed in said composition by an anionic emulsifier.

7. A composition according to claim 5 wherein said resin particles are dispersed in said composition by an anionic emulsifier.

8. A composition according to claim 6 wherein said resin particles are substantially chemically and physically homogeneous.

9. A composition according to claim 7 wherein said resin particles are substantially chemically and physically homogeneous.

10. A composition according to claim 1 wherein said resin particles are said (B) resin particles.

11. A composition according to claim 2 wherein said resin particles are substantially chemically and physically homogeneous.

12. A composition according to claim 3 wherein said resin particles are substantially chemically and physically homogeneous.

13. A composition according to claim 10 wherein said resin particles are seed polymerized resin particles.

14. An acidic aqueous coating composition which is effective in forming on a metallic surface immersed therein a resinous coating which increases in weight or thickness the longer said surface is immersed in said composition in the absence of any electrical charge on said metallic surface other than that which may be imparted thereto by said composition, said composition comprising:
    (A) about 5 to about 550 g/l of resin solids selected from the class consisting of resin particles prepared by polymerizing (i) a conjugated diene, (II) $CH_2=CH-R$ wherein R is an aryl or cyano group, (iii) a vinylidene halide, and (iv) a monoethylenically unsaturated monomer having a functional group selected from the class consisting of amide and carboxyl groups; and resin particles which are substantially chemically and physically homogeneous;
    (B) a ferric-containing compound which is soluble in the composition in an amount equivalent to about 0.025 to about 3.5 g/l of ferric iron; and
    (C) acid in an amount sufficient to impart to the composition a pH within the range of about 1.6 to about 5,
wherein the concentration of surfactant, if any, in the aqueous phase of said composition is below the critical micelle concentration.

15. A composition according to claim 14 wherein said acid is HF.

16. A composition according to claim 14 wherein said resin particles are dispersed in said composition by an anionic emulsifier.

17. A composition according to claim 15 wherein said resin particles are dispersed in said composition by an anionic emulsifier.

18. A composition according to claim 17 wherein said resin particles are prepared from the monomeric constituents set forth in paragraph (A) of claim 14.

19. A composition according to claim 17 wherein said resin particles are substantially chemically and physically homogeneous.

20. An acidic aqueous coating composition which is effective in forming on a metallic surface immersed therein a resinous coating which increases in weight or thickness the longer said surface is immersed in said composition in the absence of any electrical charge on said metallic surface other than that which may be imparted thereto by said composition, said composition comprising:
    (A) about 50 to about 100 g/l of cross-linked resin solids selected from the class consisting of resin particles prepared by polymerizing (i) a conjugated diene, (ii) $CH_2=CH-R$ wherein R is an aryl or cyano group, (iii) a vinylidene halide, and (iv) a monoethylenically unsaturated monomer having a functional group selected from the class consisting of amide and carboxyl groups; and resin particles which are substantially chemically and physically homogeneous;

(B) ferric fluoride in an amount such that it contains the equivalent of about 0.5 to about 3.5 g/l of ferric iron;

(C) about 0.2 to about 5 g/l of HF; and wherein the pH of said composition is within the range of about 1.6 to about 4, wherein the concentration of surfactant, if any, in the aqueous phase of the composition is below the critical micelle concentration.

21. A composition according to claim 20 wherein said resin particles comprise the polymerized constituents of:

(A) about 25 to about 70 wt. % of said conjugated diene;
(B) about 5 to about 70 wt. % of said $CH_2=CHR$;
(C) about 1 to about 50 wt. % of said vinylidene halide; and
(D) about 0.5 to about 15 wt. % of said unsaturated monomer.

22. A composition according to claim 21 wherein said resin particles comprise the polymerized constituents of:

(A) about 40 to about 65 wt. % of said conjugated diene;
(B) about 30 to about 65 wt. % of said $CH_2=CHR$;
(C) about 3 to about 15 wt. % of said vinylidene halide; and
(D) about 1 to about 4 wt. % of said unsaturated monomer.

23. A composition according to claim 21 wherein said conjugated diene is butadiene, said $CH_2=CHR$ is styrene, said vinylidene halide is vinylidene chloride and said unsaturated monomer is methacrylic acid.

24. A composition according to claim 22 wherein said conjugated diene is butadiene, said $CH_2=CHR$ is styrene, said vinylidene halide is vinylidene chloride and said unsaturated monomer is methacrylic acid.

25. A composition according to claim 24 wherein the source of said resin particles is a latex containing about 1 to about 4 wt. % of an emulsifier based on the resin solids of the latex and wherein said emulsifier comprises at least about 90 wt. % of an anionic emulsifier.

26. A composition according to claim 25 wherein said resin particles are substantially chemically and physically homogeneous.

27. A composition according to claim 25 wherein said emulsifier comprises about 100 wt. % of an anionic emulsifier.

28. A process for preparing an autodepositing composition from an aqueous resin/pigment concentrate comprising combining an aqueous resin/pigment concentrate consisting essentially of:

(A) about 350 to about 550 g/l of resin particles selected from the class consisting of resin particles prepared by polymerizing (i) a conjugated diene, (ii) $CH_2=CH-R$ wherein R is an aryl or cyano group, (iii) a vinylidene halide, and (iv) a monoethylenically unsaturated monomer having a functional group selected from the class consisting of amide and carboxyl groups; and resin particles which are substantially chemically and physically homogeneous; and (B) about 10 to about 550 g/l of pigment;

with other constituents of said autodepositing composition, including acid, oxidizing agent and additional water; wherein the concentration of surfactant, if any, in the aqueous phase of said composition is below the critical micelle concentration.

29. A process according to claim 28 wherein said resin particles comprise the polymerized constituents of:

(A) about 25 to about 70 wt. % of said conjugated diene;
(B) about 5 to about 70 wt. % of said $CH_2=CHR$;
(C) about 1 to about 50 wt. % of said vinylidene halide; and
(D) about 0.5 to about 15 wt. % of said unsaturated monomer.

30. A process according to claim 29 wherein said resin particles comprise the polymerized constituents of:

(A) about 40 to about 65 wt. % of said conjugated diene;
(B) about 30 to 65 wt. % of said $CH_2=CHR$;
(C) about 3 to about 15 wt. % of said vinylidene halide; and
(D) about 1 to about 4 wt. % of said unsaturated monomer.

31. A process according to claim 30 wherein said conjugated diene is butadiene, said $CH_2=CHR$ is styrene, said vinylidene halide is vinylidene chloride and said unsaturated monomer is methacrylic acid.

32. A process according to claim 31 wherein said resin particles are dispersed in said concentrate by an anionic emulsifier and wherein said pigment is dispersed in said concentrate by a nonionic emulsifier.

33. A process according to claim 32 wherein said pigment is furnace black.

34. A composition according to claim 1 including also a pigment.

35. A composition according to claim 25 including also a pigment.

36. A composition according to claim 35 wherein said pigment is furnace black.

37. A composition according to claim 1 including also a dye.

38. A composition according to claim 20 including also hydrogen peroxide.

39. A method for coating a metallic surface comprising immersing said surface in the composition of claim 1.

40. A method for coating an iron surface comprising immersing said surface in the composition of claim 14.

41. A method for coating an iron surface comprising immersing said surface in the composition of claim 20.

42. A method for coating an iron surface comprising immersing said surface in the composition of claim 27.

43. A method for coating a steel surface comprising:

(A) cleaning the steel surface with a cleaning agent to the extent that a water break-free film can be formed on the surface;
(B) water rinsing the cleaned steel surface to remove therefrom residual cleaning agent;
(C) immersing said surface in the coating composition of claim 27 for a period of time of about 45 to about 90 seconds to form on the surface a coating having a thickness of about 0.7 to about 1.3 mils;
(D) withdrawing the coated surface from the composition, and either immediately or after a partial air dry of about 30 to about 60 seconds, water rinsing the coated surface to remove therefrom residual coating composition and superficial coating film;
(E) contacting the coated surface with an aqueous chromium rinse solution comprising about 1 to about 3 g/l of total chromium, with about 0.75 to about 2.25 g/l being hexavalent chromium and the remainder of the chromium being in the reduced state, for about 10 to about 45 seconds; and (F) baking the coated surface at a temperature within the range of about 120° C. to about 180° C. for a period of time for about 10 to about 30 minutes.

44. A method according to claim 43 wherein said composition includes about 0.2 to 3g of nonionically dispersed furnace black/100 g of resin solids.

45. A method according to claim 44 wherein said steel surface is hot rolled steel.

46. A composition according to claim 1 in which the concentration of surfactant, if any, in the aqueous phase of the composition is below the surfactant concentration which corresponds to the inflection point on a graph of surface tension versus the logarithm of surfactant concentration in the composition.

47. A method according to any one of claims 39 to 45 wherein the concentration of surfactant, if any, in the aqueous phase of the composition is below the surfactant concentration which corresponds to the inflection point on a graph of surface tension versus the logarithm of surfactant concentration in the composition.

48. An acidic aqueous coating composition of the type which is effective in forming on a metallic surface immersed therein a resinous coating which increases in weight or thickness the longer said surface is immersed in said composition in the absence of any electrical charge on said metallic surface other than that which may be imparted thereto by said composition, including as activating ingredients ferric iron and fluoride, and including also dispersed pigment, and characterized by the presence therein of anionically dispersed resin particles which are prepared by polymerizing (i) a conjugated diene, (ii) $CH_2=CH-R$ wherein R is an aryl or cyano group, (iii) a vinylidene halide, and (iv) a monoethylenically unsaturated monomer having a functional group selected from the class consisting of amide and carboxyl groups, wherein the concentration of surfactant, if any, in the aqueous phase of said composition is below the critical micelle concentration.

49. An acidic aqueous coating composition of the type which is effective in forming on a metallic surface of immersed therein a resinous coating which increases in weight or thickness the longer said surface is immersed in said composition in the absence of any electrical charge on said metallic surface other than that which may be imparted thereto by said composition, including as activating ingredients ferric iron and fluoride, and including also dispersed pigment, and characterized by the presence therein of anionically dispersed resin particles which are substantially chemically and physically homogeneous, wherein the concentration of surfactant, if any, in the aqueous phase of said composition is below the critical micelle concentration.

50. A composition according to claim 48 or 49 wherein the concentration of surfactant, if any, in the aqueous phase of said composition is below the surfactant concentration which corresponds to the inflection point on a graph of surface tension versus the logarithm of surfactant concentration in the composition.

51. A composition according to claim 48 wherein said resin particles are substantially chemically and physically homogeneous.

52. A composition according to claim 50 which said pigment comprises black pigment particles having adsorbed thereon non-ionic dispersing agent.

53. A composition according to claim 49 including about 50 to 100 g/l of resin particles, ferric fluoride in an amount such that it contains the equivalent of about 0.5 to about 3.5 g/l of ferric iron and about 0.2 to about 5 g/l of HF, and wherein the pH of the composition is within the range of about 1.6 to about 4.

54. A composition according to claim 14 in which the concentration of surfactant, if any, in the aqueous phase of the composition is below the surfactant concentration which corresponds to the inflection point on a graph of surface tension versus the logarithm of surfactant concentration in the composition.

55. A composition according to claim 20 in which the concentration of surfactant, if any, in the aqueous phase of the composition is below the surfactant concentration which corresponds to the inflection point on a graph of surface tension versus the logarithm of surfactant concentration in the composition.

* * * * *

UNITED STATES PATENT AND TRADEMARK OFFICE
CERTIFICATE OF CORRECTION

PATENT NO. : 4,191,676      Page 1 of 2
DATED : March 4, 1980
INVENTOR(S) : Wilbur S. Hall It is certified that error appears in the above-identified patent and that said Letters Patent are hereby corrected as shown below:

On the cover page of the patent, in the lines identified by "[73] Assignee:", for "Union Carbide Corporation, New York, N.Y." read --Amchem Products, Inc., Ambler, Pa.--.

Column 4, line 59, "associted" should read --associated--.

Column 6, line 57, delete "such" (first occurrence).

Column 10, line 16, "compositions" should read --composition--.

Column 10, line 33, "contains" should read --contain--.

Column 13, line 33, "and or" should read --and/or--.

Column 13, line 60, "formation" should read --formulation--.

Column 16, line 20, "soilds" should read --solids--.

Column 16, line 21, "32°C" should read -- -32°C--.

Column 19-20 (Table 6), line 59, under heading "Latex", "Latex" should read --Latex 1--.

Column 24, line 21 (Claim 14), "(II)" should read --(ii)--.

Column 28, line 1, delete "of" at beginning of line.

UNITED STATES PATENT AND TRADEMARK OFFICE
CERTIFICATE OF CORRECTION

PATENT NO. : 4,191,676

DATED : March 4, 1980

INVENTOR(S) : Wilbur S. Hall

It is certified that error appears in the above-identified patent and that said Letters Patent are hereby corrected as shown below:

Column 28, line 23 (Claim 52), read --in-- following "50".

Claim 53, line 1, "49" should read --50--.

Signed and Sealed this

Twenty-second Day of July 1980

[SEAL]

Attest:

SIDNEY A. DIAMOND

Attesting Officer

Commissioner of Patents and Trademarks